US009248902B2

(12) United States Patent
Benthien et al.

(10) Patent No.: US 9,248,902 B2
(45) Date of Patent: Feb. 2, 2016

(54) CONNECTION ARRANGEMENT, AIRCRAFT OR SPACECRAFT, METHOD FOR DROPPING LOAD AND METHOD FOR LANDING

(75) Inventors: Hermann Benthien, Sottrum (DE); Andreas Poppe, Reessum (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 294 days.

(21) Appl. No.: 13/885,597

(22) PCT Filed: Nov. 16, 2011

(86) PCT No.: PCT/EP2011/070233
§ 371 (c)(1), (2), (4) Date: Aug. 29, 2013

(87) PCT Pub. No.: WO2012/066027
PCT Pub. Date: May 24, 2012

(65) Prior Publication Data

US 2013/0327882 A1 Dec. 12, 2013

Related U.S. Application Data

(60) Provisional application No. 61/414,525, filed on Nov. 17, 2010.

(30) Foreign Application Priority Data

Nov. 17, 2010 (DE) ........................ 10 2010 044 048

(51) Int. Cl.
*B64C 3/38* (2006.01)
*B64C 1/26* (2006.01)
*B64D 1/08* (2006.01)

(52) U.S. Cl.
CPC . *B64C 3/385* (2013.01); *B64C 1/26* (2013.01); *B64D 1/08* (2013.01)

(58) Field of Classification Search
None
See application file for complete search history.

(56) References Cited

U.S. PATENT DOCUMENTS 1,664,295 A * 3/1928 Hall .............................. 244/7 R
1,842,656 A * 1/1932 Carolin .......................... 244/204
1,895,679 A * 1/1933 McPherson, IV ............... 244/48
1,903,752 A * 4/1933 Belizzi ............................ 244/48
2,063,030 A * 12/1936 Crouch ......................... 244/7 C
2,082,172 A * 6/1937 Mignet ........................... 244/48

(Continued)

FOREIGN PATENT DOCUMENTS

FR 2935351 3/2010
GB 223966 10/1924

OTHER PUBLICATIONS

French Search Report, Apr. 4, 2012.

*Primary Examiner* — Medhat Badawi
(74) *Attorney, Agent, or Firm* — Greer, Burns & Crain, Ltd.

(57) ABSTRACT

A connection arrangement having: a fuselage portion; a wing portion which is mounted on the fuselage portion in an upper region thereof; a first Z-coupling element which couples the wing portion to the fuselage portion in the vertical direction thereof; and two XZ-coupling elements which couple the wing portion to the fuselage portion in the vertical direction and longitudinal direction thereof; the first Z-coupling element being longitudinally adjustable in the vertical direction in order to thus adjust an angle of attack of the wing portion.

12 Claims, 4 Drawing Sheets

(56) References Cited

U.S. PATENT DOCUMENTS 2,148,962 A * 2/1939 Potoczek ...................... 244/218
2,186,558 A * 1/1940 Rouanet et al. ................. 244/38
2,504,767 A * 4/1950 Wallis ............................ 244/46
2,538,433 A * 1/1951 Snyder ...................... 244/117 R
2,589,994 A * 3/1952 Custer ......................... 244/35 R
2,657,882 A * 11/1953 Perry .............................. 244/48
2,912,191 A * 11/1959 Millam ........................... 244/48
2,985,408 A * 5/1961 Johnson .......................... 244/48
3,179,352 A * 4/1965 Nelson .......................... 244/7 C
3,190,583 A * 6/1965 Stoppe ........................... 244/48
3,258,228 A * 6/1966 Crook ............................ 244/46
3,288,421 A * 11/1966 Peterson ....................... 248/396
3,307,807 A * 3/1967 Stoppe ........................... 244/48
3,415,469 A * 12/1968 Spratt ............................ 244/48
3,516,624 A * 6/1970 Crook ............................... 244/2
3,614,032 A * 10/1971 Purcell, Jr. ...................... 244/36
3,795,374 A * 3/1974 Zech et al. ...................... 244/46
4,482,108 A * 11/1984 Sutton .......................... 244/12.4
4,944,531 A * 7/1990 Knabel et al. ................. 280/806
6,095,456 A * 8/2000 Powell ........................... 244/54
6,705,568 B2 * 3/2004 Lee ................................ 244/46
7,066,429 B2 * 6/2006 Mellor et al. ............. 244/102 R
8,382,038 B2 * 2/2013 Benthien ...................... 244/131
8,740,150 B2 * 6/2014 Werth et al. ................... 244/131
8,991,762 B2 * 3/2015 Voss et al. ..................... 244/131
2010/0059623 A1 * 3/2010 Cazals et al. .................... 244/46
2011/0266398 A1 * 11/2011 Voss et al. ................... 244/45 R

* cited by examiner

CONNECTION ARRANGEMENT, AIRCRAFT OR SPACECRAFT, METHOD FOR DROPPING LOAD AND METHOD FOR LANDING

CROSS-REFERENCES TO RELATED APPLICATIONS

This application claims the benefit of the U.S. Provisional Application No. 61/414,525, filed on Nov. 17, 2010, and of the German patent application No. 10 2010 044 048.5 filed on Nov. 17, 2010, the entire disclosures of which are incorporated herein by way of reference.

FIELD OF THE INVENTION

The present invention relates to a connection arrangement, to an aircraft or spacecraft, to a method for dropping load, and to a method for landing.

BACKGROUND OF THE INVENTION

For example, publication DE 10 2006 051 572 A1 discloses a connection arrangement according to the preamble of claim 1.

Connection arrangements of this type are used in particular in transport aircraft, such as the Airbus A400M. Transport aircraft of this type are mostly configured as high-wing planes and are used inter alia to drop loads from a hold of the aircraft during flight. For this purpose, the transport aircraft comprise a rail system in their hold, which system leads to an opening in the fuselage and displaceably carries the loads towards the opening. In addition, a parachute is provided which, for dropping the loads, pulls the loads out from the opening in the rail system.

SUMMARY OF THE INVENTION

An aspect of the present invention consists in providing an improved approach for dropping loads from an aircraft or spacecraft.

A connection arrangement is accordingly provided, comprising: a fuselage portion; a wing portion which is mounted on the fuselage portion in an upper region thereof; a first Z-coupling element which couples the wing portion to the fuselage portion in the vertical direction thereof; and two XZ-coupling elements, which couple the wing portion to the fuselage portion in the vertical and longitudinal directions thereof; wherein the first Z-coupling element is longitudinally adjustable in the vertical direction, in order to thereby adjust the angle of attack of the wing portion.

An aircraft or spacecraft comprising the connection arrangement according to the invention is also provided.

A method for dropping loads by means of the aircraft or spacecraft according to the invention is further provided, the angle of attack of the wing portion being changed for dropping the loads from a hold of the aircraft or spacecraft.

Furthermore, a method for landing the aircraft or spacecraft according to the invention is provided, the angle of attack of the wing portion being changed in such a way that the fuselage portion is oriented substantially horizontally during landing.

The idea on which the present invention is based consists in providing a Z-coupling element of a connection arrangement known per se in a longitudinally adjustable manner, in order to thus adjust the angle of attack of the wing portion. This adjustment of the angle of attack can then generally be used to change the lift of the wing portion. In particular, the adjustment of the angle of attack can be used to move the fuselage portion into an oblique attitude. Gravitational force then causes loads arranged in the fuselage portion to automatically slide out of the hold through an opening in the fuselage of the aircraft. The use of a parachute, as described in the introduction, can thus be dispensed with.

Furthermore, the adjustment of the angle of attack can be used to orient the fuselage portion substantially horizontally during landing. A three-point landing is thus possible, meaning that the aircraft lands on its nose wheel and main landing gear simultaneously.

Advantageous configurations of the present invention emerge from the dependent claims.

According to a configuration of the connection arrangement according to the invention, a second Z-coupling element is provided, which is provided so as to be longitudinally adjustable in the opposite direction to the first Z-coupling element. A redundancy is thus created, so that in the case of failure of the one Z-coupling element, the other Z-coupling element still provides a support in the vertical direction.

According to a further configuration of the connection arrangement according to the invention, an electric and/or hydraulic actuating drive is provided for vertical adjustment. An electric and a hydraulic actuating drive are preferably provided, so that in the event that one of the two actuating drives fails, the other is still operative. A redundancy is also hereby created.

According to a further configuration of the connection arrangement according to the invention, the actuating drive comprises a threaded spindle and/or a hydraulic cylinder. The threaded spindle and/or the hydraulic cylinder is preferably articulated at the end thereof to the fuselage portion and at the other end thereof to the wing portion.

According to a further configuration of the connection arrangement according to the invention, the two Z-coupling elements are arranged in such a way that the force action lines thereof intersect inside or above the wing portion. An appropriate kinematics is thus provided, in order to effect an adjustment of the angle of attack of the wing portion.

According to a further configuration of the connection arrangement according to the invention, the first Z-coupling element is arranged in the longitudinal direction of the fuselage portion in front of or behind the XZ-coupling elements and/or the first Z-coupling element is arranged in front of and the second Z-coupling element is arranged behind the XZ-coupling elements. A kinematically advantageous solution is also hereby provided.

According to a further configuration of the connection arrangement according to the invention, the fuselage portion comprises an upper recess which covers the wing portion at least in part and/or in which the wing portion engages from above at least in part, in each case two of the XZ-coupling elements and at least the first Z-coupling element being arranged in opposite, lateral regions of the recess. The fuselage portion is thus coupled to the wing portion at least by means of six coupling elements. These elements can also be supplemented by Y-coupling elements which couple the wing portion to the fuselage portion in the transverse direction thereof, and/or by the second Z-coupling elements.

The invention will be further explained in the following by way of embodiments with reference to the accompanying figures of the drawings.

BRIEF DESCRIPTION OF THE DRAWINGS

In the figures.

In the figures, like reference numerals denote like or functionally equivalent components, unless information to the contrary is given.

DETAILED DESCRIPTION OF THE PREFERRED EMBODIMENTS

Figure 1:
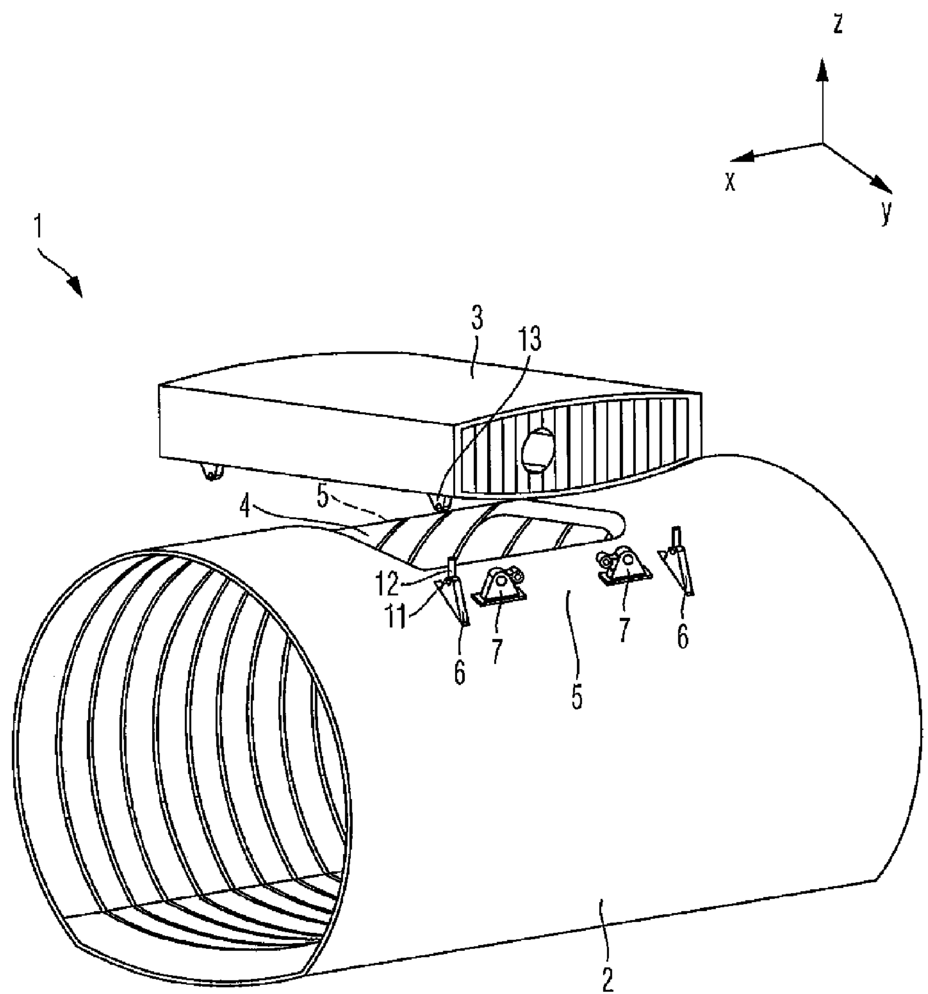
FIG. 1 is a perspective view of a connection arrangement according to an embodiment of the present invention.

FIG. 1 is a perspective view of a connection arrangement 1 of an aircraft 20 (see FIG. 3) according to an embodiment of the present invention.

The connection arrangement 1 comprises a fuselage portion 2 and a wing portion 3.

The fuselage portion 2 is configured with an approximately rectangular recess 4 in the upper face thereof. The recess 4 can be configured as an opening in the fuselage portion 2 or merely as a recessed region in the fuselage portion. The recess 4 is laterally limited by regions 5. In FIG. 1 only one of the regions 5 can be seen; the other region 5 is covered and therefore indicated with a dashed reference numeral line.

The following explanations only refer to the region 5 which can be seen in FIG. 1, but apply equally to the region 5 which is covered in FIG. 1.

In the region 5, two Z-coupling elements 6 and two XZ-coupling elements 7 are provided. The two XZ-coupling elements 7 are arranged in the longitudinal direction X of the fuselage portion 2 between the two Z-coupling elements 6.

The Z- and XZ-coupling elements 6, 7 connect the fuselage portion 2 to the wing portion 3. In FIG. 1 the wing portion 3 is shown spaced from the fuselage portion 2 for increased clarity. In the state, wherein the fuselage portion 2 is connected to the wing portion 3, the wing portion 3 rests on the fuselage portion 2 and overlaps the recess 4 and engages therein.

The Z- and XZ-coupling elements 6, 7 can each comprise a metal fitting 11, a rod 12 and a metal fitting 13. The metal fitting 11 is rigidly mounted on the fuselage portion 2 and pivotably connected to an end of the rod 12 by means of an eye-bolt connection. The metal fitting 13 is rigidly mounted on the wing portion 3 and pivotably connected to the other end of the rod 12 by means of an eye-bolt connection.

The connection arrangement 1 can further comprise Y-coupling elements 8 which couple the fuselage portion 2 in the transverse direction Y thereof to the wing portion 3. The Z-coupling elements 6, XZ-coupling elements 7 and Y-coupling elements 8 can be matched to one another in such a way that in the case of a fault of one of the coupling elements, the other elements ensure a load-bearing capacity which is sufficient to enable safe normal flight operation.

Figure 2A:
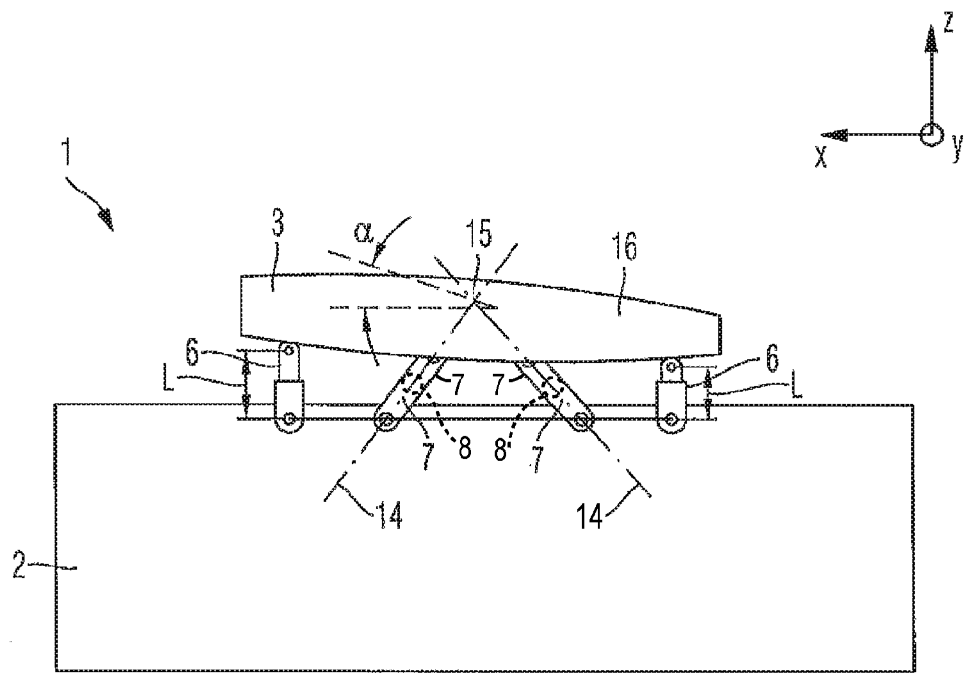
FIG. 2A is a schematic side view of the connection arrangement of FIG. 1 with a positive angle of attack.
Figure 2B:
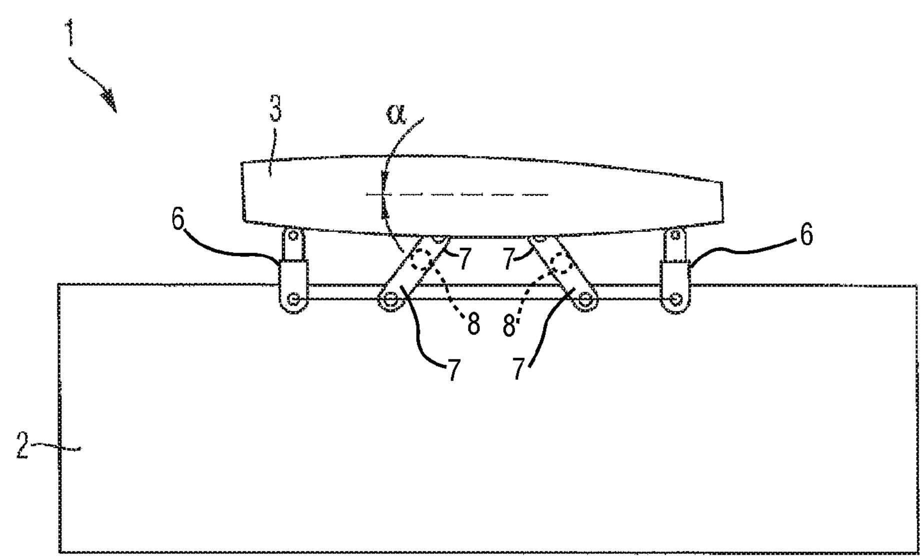
FIG. 2B shows the view of FIG. 2A with an angle of attack equal to zero.
Figure 2C:
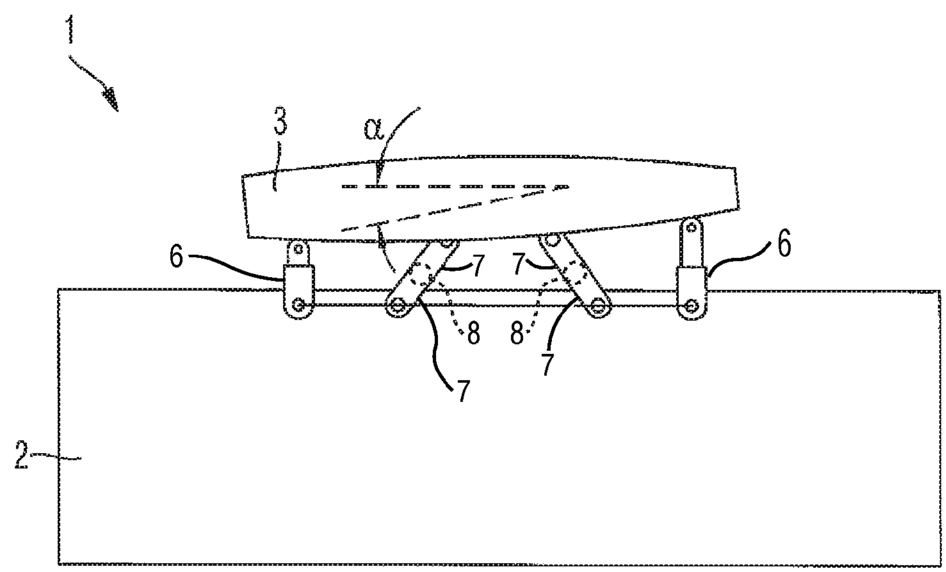
FIG. 2C shows the view of FIG. 2A with a negative angle of attack.

FIG. 2A-2C are each schematic side views from FIG. 1 for different angles of attack $\alpha$.

As can be seen from FIG. 2A-2C, the Z-coupling elements 6 couple the wing portion 3 to the fuselage portion in the vertical direction Z of the fuselage portion 2. The XZ-coupling elements 7 connect the wing portion 3 to the fuselage portion 2, both in the vertical direction Z and in the longitudinal direction X of the fuselage portion 2 and, for this purpose, extend obliquely in the XZ-plane. The XZ-coupling elements 7 are arranged in such a way that the force action lines 14 (thus the direction in which the XY-coupling elements 7 can absorb a force) intersect at a point of intersection 15 located in the wing portion 3.

The Z-coupling elements 6 are, for example, configured as threaded spindles, the length L of which is adjusted by means of actuation by an electric motor or by a hydraulic motor. Hydraulic cylinders could also be used instead of the spindles. The changes in length of the Z-coupling elements 6 occur in opposite directions to one another, so that the length L of one Z-coupling element 6 is respectively increased or reduced when the length L of the other Z-coupling element 6 is respectively reduced or increased. In this way, the wing portion 3 is pivoted about a pivot axis which extends in the transverse Y direction of the fuselage portion 2 (thus in a spanwise direction), whereby the angle of attack $\alpha$ of the wing portion 3 is adjusted.

FIG. 2A thus shows for example a positive angle of attack $\alpha$, FIG. 2B an angle of attack $\alpha$ equal to zero and FIG. 2C a negative angle of attack $\alpha$. By "angle of attack $\alpha$" the angle between the direction of the oncoming air and the chord of the wing profile 16 is meant. The lift that the aircraft 20 experiences is set by adjusting the angle of attack.

In addition, the orientation of the fuselage portion 2 in relation to a horizontal or the gravitational direction G (see FIG. 3) can be adjusted by adjusting the angle of attack $\alpha$.

Figure 3:
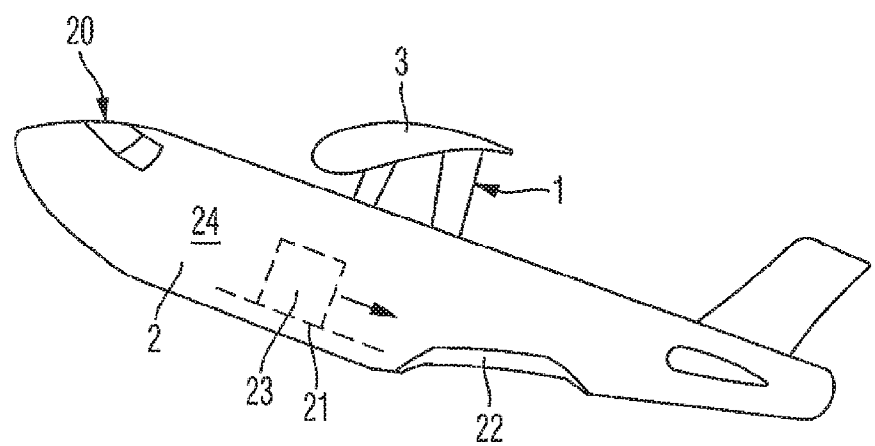
FIG. 3 is a side view of an aircraft or spacecraft according to an embodiment of the present invention.
Figure 3:
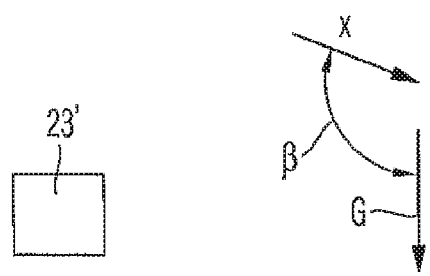
Figure 4:
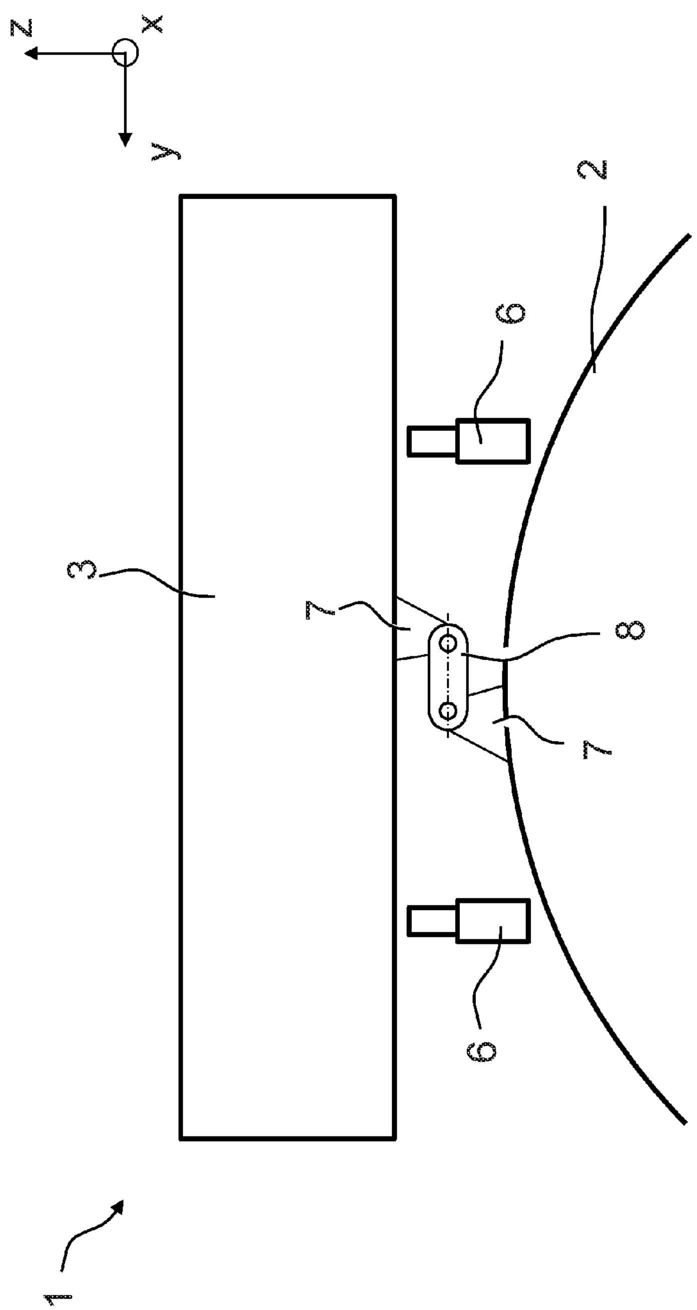
FIG. 4 is a schematic side view of the connection arrangement of FIG. 1, featuring a Z-coupling element, a XZ-coupling element, and a Y-coupling element according to an embodiment of the present invention.

FIG. 3 shows a schematic side view of an aircraft 20 in accordance with an embodiment of the present invention.

The aircraft 20 comprises the connection arrangement 1 from FIG. 1-2C. In addition, the aircraft 20 comprises a rail system 21 in its interior 24, which system leads to a loading and unloading opening 22 in the fuselage portion 2. A load 23 is positioned on the rail system 21, which load slides (or rolls) in the direction of the opening 22 when the longitudinal direction X of the fuselage portion 2 forms an angle $\beta$ of more than 90° with the effective direction of the weight G, and can thus be dropped, as shown for the load 23' in FIG. 3.

In the same way (not, however, shown further in the figures), the angle of attack $\alpha$ during approach of the aircraft 20 can be adapted in such a way that the longitudinal direction X of the fuselage portion 2 and of the aircraft 20 is substantially parallel to the landing strip so that the aircraft 20 can touch down with its nose gear and main landing gear at the same time.

Although the invention has presently been described by way of preferred embodiments, it is not in any way limited thereto, but can be modified in various ways. In particular, it should be noted that "a" does not presently exclude a plurality. Furthermore, the embodiments and configurations presently described for the connection arrangement according to the invention apply accordingly to the aircraft or spacecraft according to the invention, the method for dropping loads and the method for landing, and vice versa.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A connection arrangement, having:

a fuselage portion;

a wing portion which is mounted on the fuselage portion in an upper region of the fuselage portion;

a first Z-coupling element which couples the wing portion to the fuselage portion in the vertical direction of the fuselage portion; and two XZ-coupling elements which couple the wing portion to the fuselage portion in the vertical direction and the longitudinal direction of the fuselage portion;

wherein the first Z-coupling element is longitudinally adjustable in the vertical direction, in order to thus adjust an angle of attack of the wing portion, wherein a second Z-coupling element is provided, which is provided so as to be longitudinally adjustable in a direction parallel to the first Z-coupling element, wherein the connection arrangement further comprises Y-coupling elements which couple the fuselage portion in the transverse direction of the fuselage portion to the wing portion, and wherein the Z-coupling elements, XZ-coupling elements and Y-coupling elements are matched to one another in such a way that in the case of a fault of one of the coupling elements, the other elements ensure a load-bearing capacity which is sufficient to enable safe normal flight operation.

2. The connection arrangement of claim 1, wherein at least one of an electric, a hydraulic and an electric and hydraulic actuating drive is provided for vertical adjustment.

3. The connection arrangement of claim 2, wherein the actuating drive comprises at least one of a threaded spindle, a hydraulic cylinder, and a threaded spindle and a hydraulic cylinder.

4. The connection arrangement of claim 1, wherein the two XZ-coupling elements are arranged in such a way that the force action lines intersect one of inside and above the wing portion.

5. The connection arrangement of claim 1, wherein the first Z-coupling element is arranged in the longitudinal direction of the fuselage portion one of in front of and behind the XZ-coupling elements.

6. The connection arrangement of claim 1, wherein the first Z-coupling element is arranged in front of and the second Z-coupling element is arranged behind the XZ-coupling elements.

7. The connection arrangement of claim 1, wherein the fuselage portion comprises an upper recess which covers the wing portion at least in part, and two of the XZ-coupling elements and at least the first Z-coupling element are arranged in opposite, lateral regions of the recess.

8. The connection arrangement of claim 1, wherein the fuselage portion comprises an upper recess in which the wing portion engages from above at least in part, and two of the XZ-coupling elements and at least the first Z-coupling element are arranged in opposite, lateral regions of the recess.

9. The connection arrangement of claim 1, wherein the fuselage portion comprises an upper recess which covers the wing portion at least in part, and in which the wing portion engages from above at least in part, and two of the XZ-coupling elements and at least the first Z-coupling element being arranged in opposite, lateral regions of the recess.

10. An aircraft or spacecraft, having a connection arrangement of claim 1.

11. A method for dropping loads by means of an aircraft or spacecraft of claim 10, wherein the angle of attack of the wing portion is changed for dropping loads from a hold of the aircraft or spacecraft.

12. A method for landing an aircraft or spacecraft of claim 10, wherein the angle of attack of the wing portion is changed in such a way that the fuselage portion is oriented substantially horizontally during landing.

* * * * *